United States Patent [19]
Murdock

[11] Patent Number: 5,857,316
[45] Date of Patent: Jan. 12, 1999

[54] MANUAL STEM CUTTING AND FRUIT COLLECTION APPARATUS

[76] Inventor: Michael T. Murdock, 760 E. 400 N., Mapleton, Utah 84664

[21] Appl. No.: 680,175

[22] Filed: Jul. 15, 1996

[51] Int. Cl.[6] .................................................. A01D 46/24
[52] U.S. Cl. .............................................. 56/332; 56/339
[58] Field of Search ................................ 56/328.1, 332, 56/334, 335, 336, 339, 330; 414/588

[56] References Cited

U.S. PATENT DOCUMENTS

| | | | |
|---|---|---|---|
| 462,386 | 11/1891 | Reno et al. | 56/339 |
| 692,838 | 2/1902 | Ellsworth | 56/339 |
| 1,329,481 | 2/1920 | Thorness | 56/335 |
| 3,449,896 | 6/1969 | Burgees | 56/339 |
| 4,191,008 | 3/1980 | Smith | 56/332 X |
| 4,463,545 | 8/1984 | Giallanza | 56/339 X |
| 4,928,461 | 5/1990 | King | 56/332 X |
| 5,463,859 | 11/1995 | Perry | 56/332 |

Primary Examiner—Michael J. Carone
Assistant Examiner—Robert Pezzuto
Attorney, Agent, or Firm—Trask, Britt & Rossa

[57] ABSTRACT

The present invention is directed to a manual stem cutting and fruit removal apparatus. The device comprises a receptacle member and a handle attached thereto. A mouth and a blade are located adjacent at the top of the receptacle member. The blade is adjustably removable for case in replacement. A collection chamber is positioned beneath the mouth and the blade and includes a sloping surface for supporting the precut fruit and a cushioned surface for catching the fruit after the stem is severed. In use, the mouth receives the fruit while it is hanging on the tree. By manipulating the device, the blade engages and cuts the stem, and the fruit falls into the collection chamber.

5 Claims, 4 Drawing Sheets

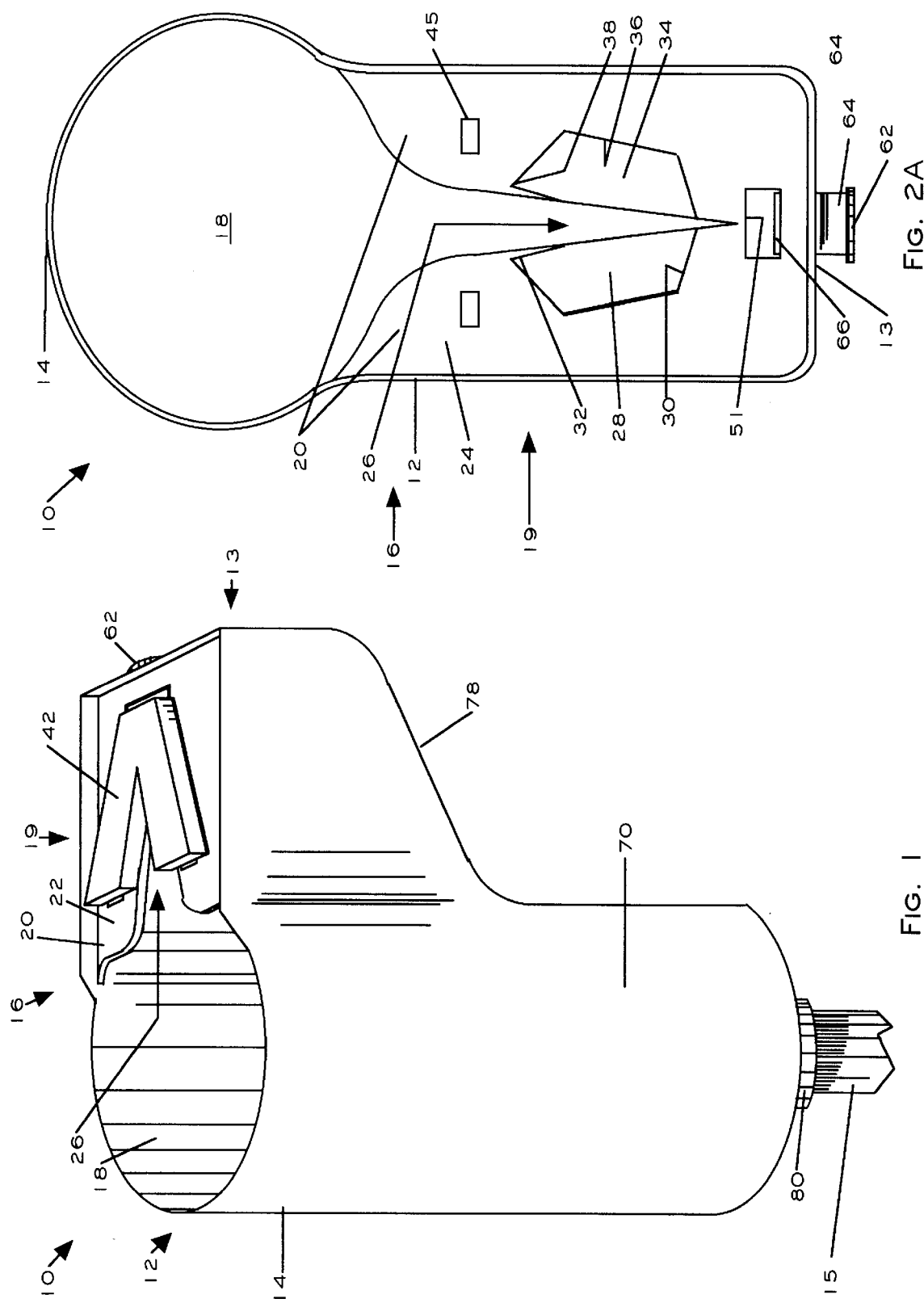

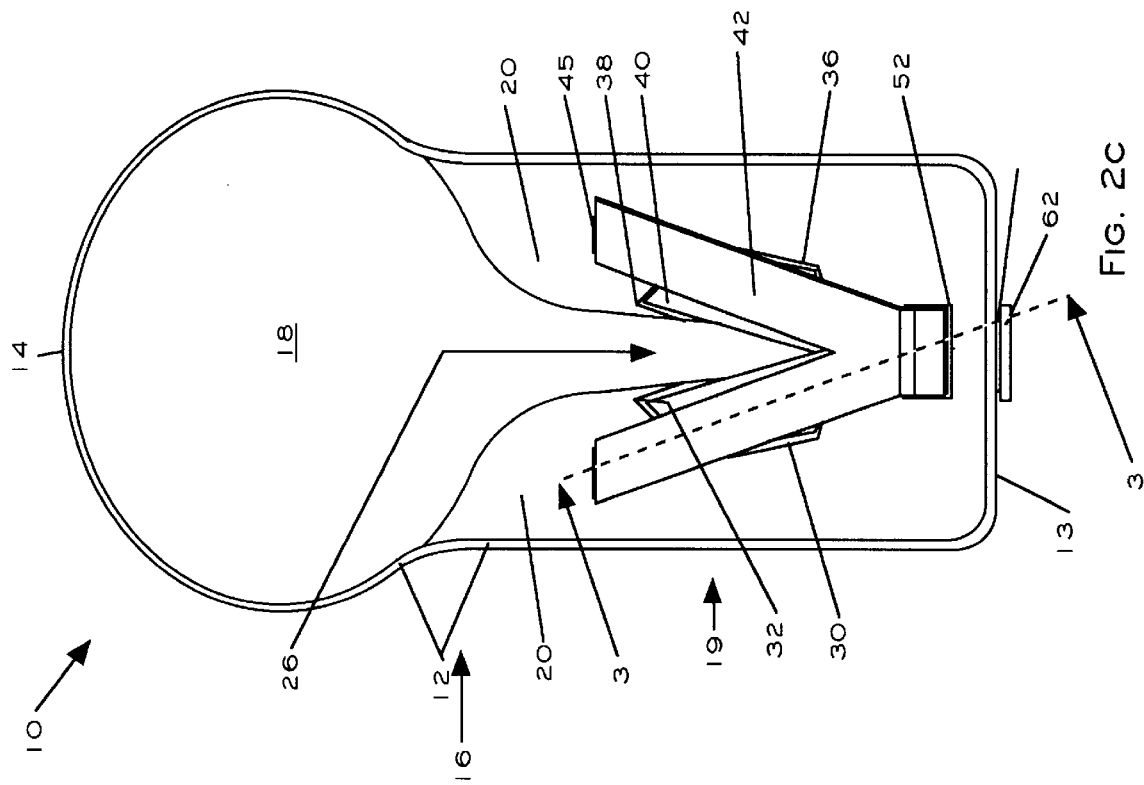
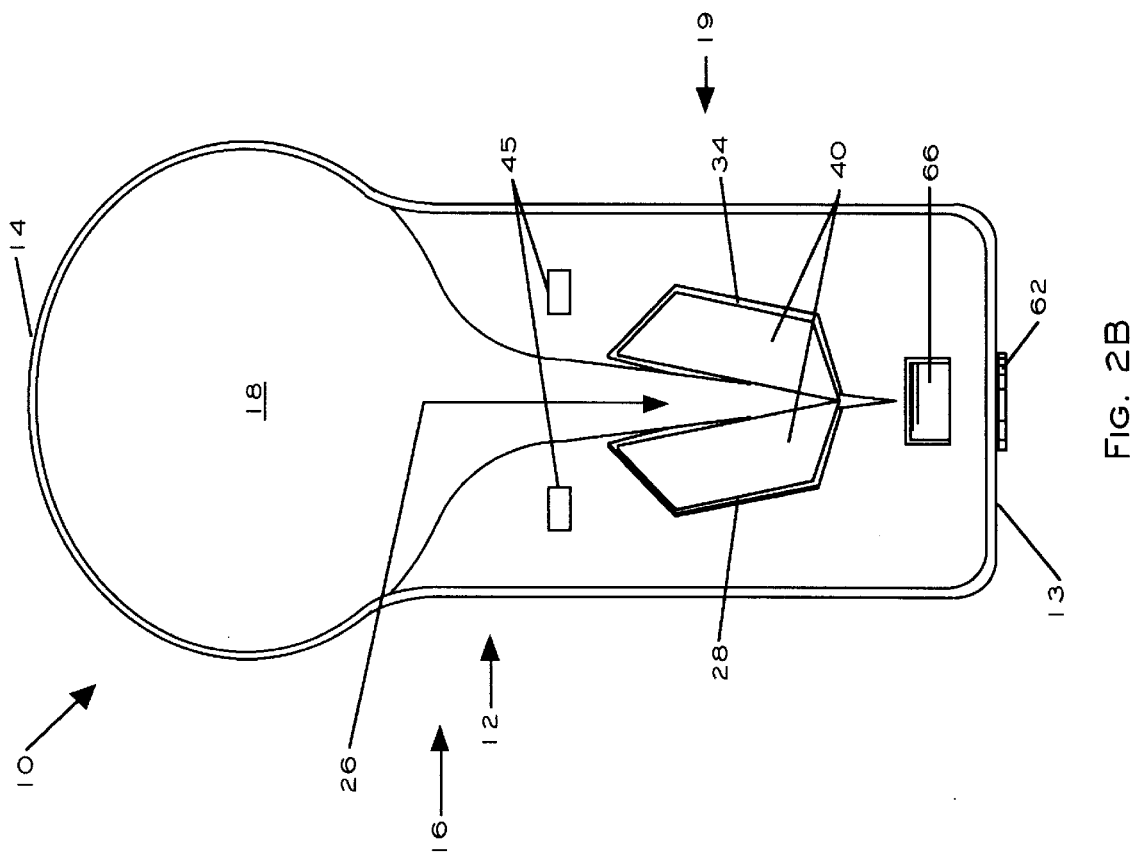

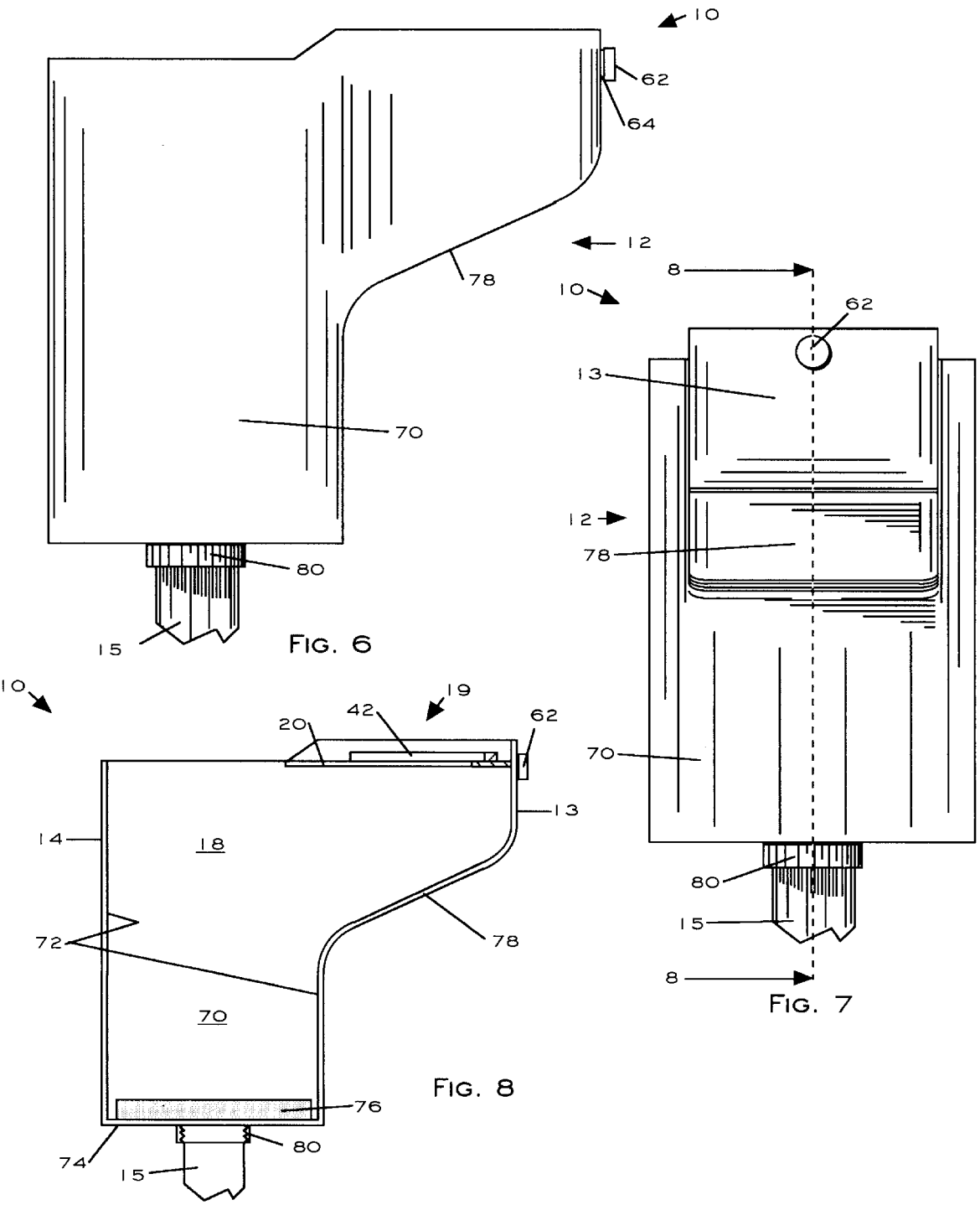

MANUAL STEM CUTTING AND FRUIT COLLECTION APPARATUS

BACKGROUND OF THE INVENTION

The present invention relates generally to the field of fruit harvesting devices. More particularly, the present invention relates to manual fruit picking apparatus.

Many manual fruit picking devices are either difficult to use or are expensive. One such device, described in U.S. Pat. No. 4,959,949, by Edward J. Wier of Springfield, Mass., is basically a box with a notch and a telescoping pole, which allows for removal of fruit from high parts of a tree. However, the fruit must be pulled from the stem, which is undesirable in that many fruit growers prefer to leave the stem on the fruit. In addition, the force required to remove fruit from a tree by pulling often causes damage to the fruit.

Some devices, such as that shown in U.S. Pat. Nos. 4,098,062 and 4,835,955 by Alfred E. Gaubis of Fruitland Park, Fla. also remove fruit by pulling. Those devices basically comprise a basket with a hingedly attached top which clamps shut over the top of the basket. A similar device is described in U.S. Pat. No. 5,083,418 by Doyal C. Reece of Florence, Ala. That device includes a blade that cuts stems as the collection basket clamps shut. However, that device is undesirable since the blade is located on the collection basket, which increases cutting effort as the basket fills with fruit. In addition, the device is undesirable because it is clumsy and since its moving parts complicate use of the device, increase the cost of manufacture and render the blade generally ineffective for cutting fruit stems. Thus, a user may still be required to pull the fruit from the tree.

Another manual fruit picking device, shown in U.S. Pat. No. 5,280,697 by Mark Miller of Vancouver, Wash. is basically a long tube with an opening and a movable blade which cuts fruit stems as fruit is inserted into the opening. The blade is engaged using one's thumb or finger, making it difficult to cut most fruit stems. In addition, while the tube shape is acceptable for picking small fruits such as berries and cherries, it is not desirable for picking larger fruits such as apples and oranges. Increasing the size of this device would add to the user's burden by creating a substantial weight increase.

A light-weight manual fruit removal device is needed which removes fruit by cutting the stem. More particularly, a device is needed which includes an effective cutting mechanism, which substantially reduces damage to fruit as compared to the existing devices which require a user to pull fruit from a tree.

SUMMARY OF THE INVENTION

The present invention comprises a manual fruit removal device which addresses the foregoing needs. The manual fruit removal device of the present invention has stationary blades which effectively cut through fruit stems.

The fruit removal device of the present invention provides the additional advantages of simple, solid construction. It has removable blades which are easily and inexpensively replaced and a long handle for removing fruit from high branches.

A preferred embodiment of the invention includes a receptacle and a handle. The receptacle comprises a mouth and a storage portion. V-shaped cutting means are located at the mouth. The inner surface of the removal portion is cushioned.

The preferred fruit removal device of the present invention further includes removable cutting means and a means for securing the cutting means. In addition, the receptacle of the preferred device is transparent.

Further advantages of the present invention will become apparent from a consideration of the drawings and the ensuing description.

DRAWING FIGURES

FIG. 1 is a side perspective view of a preferred embodiment of the present invention;

FIG. 2A is a top plan view of the embodiment shown in FIG. 1 with the blade holder and blades removed;

FIG. 2B is a top plan view of the embodiment shown in FIG. 1, with the blade holder removed;

FIG. 2C is a top plan view of the embodiment shown in FIG. 1;

FIG. 6 is a side plan view of the embodiment shown in FIG. 1;

FIG. 7 is a frontal plan view of the embodiment shown in FIG. 1;

FIG. 8 is a side cross sectional view of FIG. 7, taken along line 8—8.

DETAILED DESCRIPTION OF THE PREFERRED EMBODIMENTS

Figure 3:
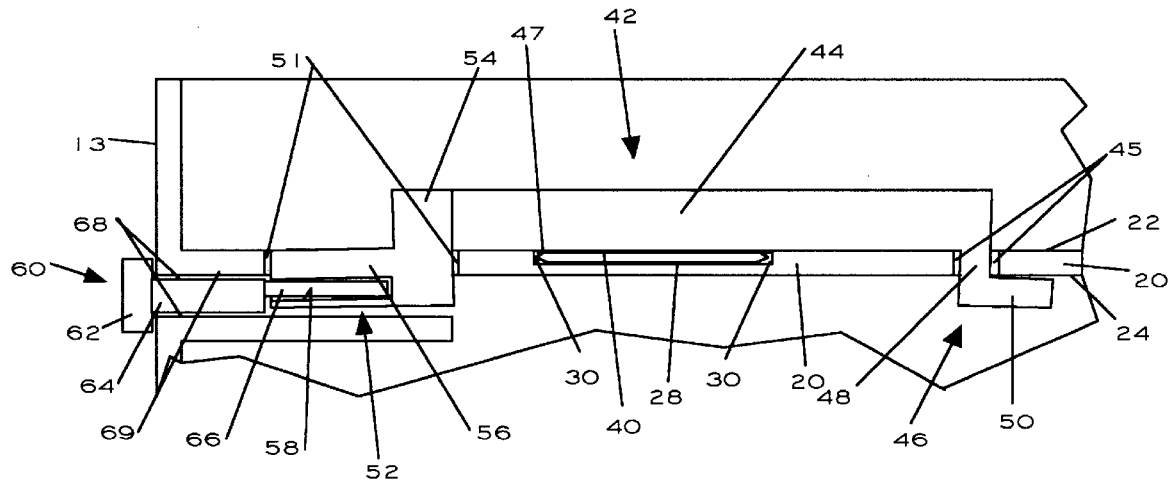
FIG. 3 is a cross section view of FIG. 2C, through line 3—3.

The present invention is directed to a manual fruit removal device which removes fruit by cutting the stem. The fruit removal device of the present invention includes a hollow receptacle having means for cutting fruit stems, a collection chamber and an elongate handle member attached to the receptacle. This fruit removal device is especially useful for removing fruit without damage while leaving a portion of the stem intact.

In this description, a preferred embodiment having a removable V-shaped cutting means is shown. In this embodiment, a hollow receptacle member is attached to a handle member. The collection chamber of the receptacle member is preferably made from a transparent material so that the fruit collected therein is visible. The handle member is preferably elongate to facilitate removal of fruit from high branches.

Referring to FIG. 1, a fruit removal device 10 comprises a receptacle member 12 having a front side 13 and a back side 14, and a handle member 15 attached to the receptacle member. Receptacle member 12 is preferably made of plastic, but can be manufactured from a variety of materials, including fiberglass and vinyls. The receptacle member material is preferably light-weight, yet durable enough to withstand impact such as dropping. Handle member 15 is preferably made from wood, but can be manufactured from a variety of materials, including plastics, vinyls and metals. The handle member material is preferably sturdy enough to support a substantial amount of weight, yet light-weight.

Receptacle member 12 includes a mouth 16 at its top portion, a collection chamber 70 comprising the bottom portion thereof and a handle member receptacle 80 attached thereto. As illustrated in FIG. 2A, at back side 14, mouth 16 forms a large opening, referred to as the fruit receiving portion 18. At front 13, mouth 16 encompass a substantially flat horizontal layer referred to as the cutting assembly 19.

Cutting assembly 19 comprises a forked base 20, the fork being referred to as the stem-cutting portion 26, two tab engagers 45 formed through the base and positioned on either side of the stem-cutting portion, two blade receptacles 28 and 34 formed in the base and positioned along opposing sides of the stem-cutting portion and a lock slot 51 formed through the base and located near front side 13.

Stem cutting portion 26 tapers from fruit receiving portion 18 and substantially into cutting assembly 19, the widest opening in the stem cutting portion being adjacent to the fruit receiving portion.

Tab engagers 45 are formed through base 20, near fruit receiving portion 18 and on opposing sides of cutting portion 26. Blade receptacles 28 and 34 are formed in top surface 24 of base 20 and positioned opposite one another along stem cutting portion 26. Blade receptacles 28 and 34 each have a lip 30 and 36 and a retaining notch 32 and 38.

Referring now to FIG. 2B, a blade 40 is removably inserted into each blade receptacle 28 and 34. Preferably, the exposed flat surface of blade 40 is raised slightly above top surface 22, as seen in FIG. 3.

Referring now to FIG. 2C, lips 30 and 36 and retaining notches 32 and 38 position blades 40 along stem cutting portion 26 such that a portion of the cutting edge of each blade protrudes from the stem cutting portion. In addition, lips 30 and 36 and retaining notches 32 and 38 secure blades 40 from sliding out of position. Preferably, blade receptacles 28 and 34 are positioned such that a portion of the cutting edges of blades 40 placed therein overlap, forming a "V". Thus, blades 40 are positioned along stem cutting portion 26 in a manner that provides for complete severance of a stem which passes along the entire length of the stem cutting portion. Blades 40 are preferably utility knife blades, such as those manufactured by Stanley Tools of New Britain, Conn. Cutting assembly 19 also includes a blade holder 42, which placed over the blade receptacles 28 and 34, and engaged by tab engagers 45 and lock slot 51.

As shown in FIG. 3, base 20 has a top surface 22 and a bottom surface 24. Lock slot 51 is formed through base 20, being centrally located and near front side 13. A straight duct of substantially constant proportion, referred to as the lock channel 68, extends beneath base 20 from front side 13 to lock slot 51. Lock channel 68 forms an opening through front side 13 and creates a passageway into lock slot 51. Blade holder 42 is removably installed over the blade receptacles (only 28 is shown) to secure blades 40 within the blade receptacles.

Figure 4:
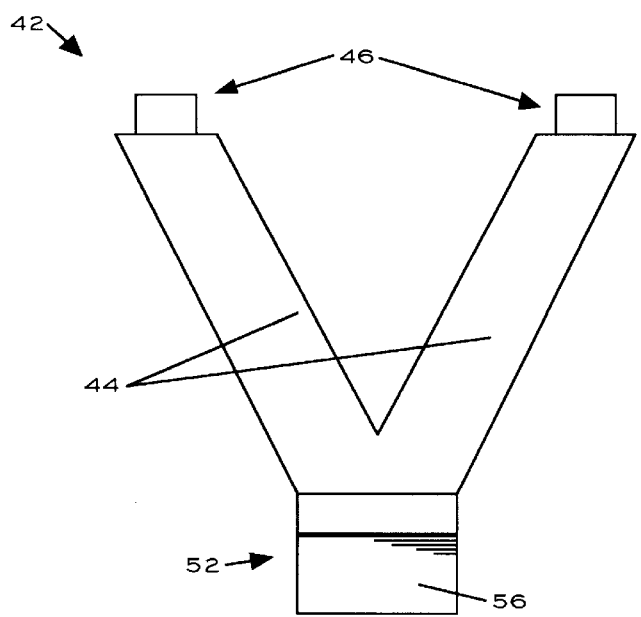
FIG. 4 is a top plan view of the blade holder of the embodiment shown in FIG. 1.
Figure 5:
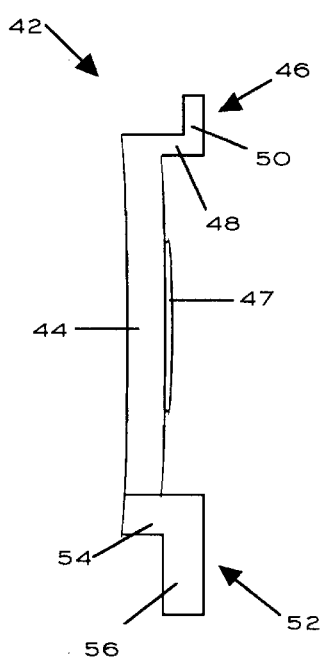
FIG. 5 is a side plan view of the blade holder of the embodiment shown in FIG. 1.

As illustrated in FIGS. 4 and 5, blade holder 42 is preferably Y-shaped, and comprises a lock receiving tab 52, two extensions from the lock receiving tab, referred to as arms 44 and an insertion tab 46 located at the free end of each arm and extending downward therefrom. FIG. 5 shows that arms 44 have a slight concave bow along their length. Preferably, a thin securing strip 47 is attached to each arm 44. Strips 47 are preferably made from foam rubber, but can be manufactured from a variety of materials, such as rubber, foam, or plastic. As blade holder 42 is secured over the blades and blade receptacles, strips 47 further secure the blades.

Insertion tabs 46 each include a downward extension referred to as the spacer 48 and a stabilizer 50 which extends outward from and substantially perpendicular to the spacer. Lock receiving tab 52 comprises a downward extension referred to as the support member 54 and a hollow lock engager 56 which extends outward from and substantially perpendicular to the support member.

Referring again to FIG. 3, lock engager 56 has a lower inner surface 58. A lock 60 is slidingly engaged within lock channel 68. Lock 60 includes a knob 62 located at front side 13, a shaft 64 attached to the knob and slidingly engaged within lock channel 68 and a bolt 66 extending from the shaft.

Blade holder 42 is installed after blades 40 have been installed in the blade receptacles. First, blade holder 42 is positioned vertically and stabilizers 50 are inserted into tab engagers 45. As blade holder 42 is placed in a horizontal position over blades 40 and base 20, stabilizers abut bottom surface 24 of base 20. Next, lock receiving tab 52 is placed within lock slot 51. Downward pressure on lock slot forces stabilizers 50 snugly upward, against bottom surface 24, and secures blades 40 between arms 44 and blade receptacles 28 and 34. Maintaining downward force on lock receiving tab 52, lock 60 is inserted into lock channel 68. Bolt 66 passes into lock slot 51 and enters lock engager 56, abutting and sliding along lower inner surface 58. When lock 60 is completely inserted, the bowing of arms 44 secure bolt 66, blades 40 and stabilizers 46. As lock 60 is forced out of lock channel 68, lock receiving tab 52 is released and blade holder 42 may then be removed.

As illustrated in FIGS. 6 and 7, a fruit catching surface 78 preferably is located beneath cutting assembly 19. Fruit catching surface 78 is positioned far enough away from bottom surface 24 of base 20 to allow the fruit to rest thereupon as a stem passes through stem cutting portion 26. Fruit catching surface 78 slopes downward from front side 13 to collection chamber 70 in order to reduce the impact as fruit enters the collection chamber.

Handle member receptacle 80 is preferably fixedly attached to bottom portion 74 of collection chamber 70. Handle member receptacle 80 is preferably threaded to screwingly receive a complimentarily threaded handle member 15.

With reference to FIG. 8, fruit receiving portion 18 opens into collection chamber 70. Collection chamber 70 includes an inner surface 72 and a bottom portion 74. Preferably, the inner surface of bottom portion 74 is lined with a cushion 76. Cushion 76 is preferably made from foam rubber, but can be manufactured from a variety of other materials including sponges and cloths. A preferred cushioning material absorbs the impact of fruit falling into collection chamber 70 and prevents bruising of the fruit.

Removing a fruit from a tree provides an example of the use of the present invention. Referring to FIG. 1, the fruit removal apparatus 10 of the present invention is lifted by handle member 15 and positioned directly beneath a fruit. The fruit removal device is raised so that the fruit enters fruit receiving portion 18. When the fruit is completely inside fruit receiving portion 18, the device is then moved backward to position the fruit beneath cutting assembly 19, where the fruit rests upon fruit catching surface 78. Next, a swift, firm backward motion forces the fruit stem into stem cutting portion 26 and between blades 40, which sever the stem. The fruit then slides down fruit catching surface 78 and into collection chamber 70.

Although the description contains many specificities, these should not be construed as limiting the scope of the invention, but as merely providing illustrations of some of the presently preferred embodiments of this invention. For example, the manual stem cutting and fruit collection apparatus described illustrates a manual fruit removal device having several specific features. However, different combinations of these features and several more embodiments of each feature are readily conceivable. Likewise, the elements of the present invention may be constructed from any material that will fulfill the stated purpose and retain the functionality of each element.

Thus the scope of the invention should be determined by the appended claims and their legal equivalents, rather than by the examples given.

What is claimed is:

1. A fruit removal device comprising:

biasing means for securing at least two independently positionable blades to the fruit removal device said biasing means including:

base member having attachment slots, said base member configured to receive at least two blades in a V-shape and permit the independent lateral positioning of said at least two blades; and a concavely bowed securing member positionable over a substantial portion of each of said at least two blades so as to mutually bias each of said at least two blades against said base member, said concavely bowed securing member having attachment tabs configured to removably engage said attachment slots as said concavely bowed securing member is placed over said at least two blades; and locking means for rigidly securing said concavely bowed securing member to said base member.

2. The fruit removal device of claim 1, further comprising a receptacle adjacent said base, said receptacle comprising a hollow member.

3. The fruit removal device of claim 2, further comprising a cushion disposed within said receptacle.

4. The fruit removal device of claim 2, wherein said receptacle comprises a sloped fruit-supporting surface beneath said base member.

5. The fruit removal device of claim 1, further comprising a handle member.

\* \* \* \* \*